US007894802B2

(12) United States Patent
Schniedenharn

(10) Patent No.: US 7,894,802 B2
(45) Date of Patent: Feb. 22, 2011

(54) METHOD FOR CARRYING OUT THE NETWORK-SIDE RECOGNITION OF SPECIFIC CAPABILITIES OF SUBSCRIBER STATIONS IN A COMMUNICATIONS SYSTEM

(75) Inventor: Jörg Schniedenharn, Bonn (DE)

(73) Assignee: Siemens Aktiengesellschaft, Munich (DE)

( * ) Notice: Subject to any disclaimer, the term of this patent is extended or adjusted under 35 U.S.C. 154(b) by 593 days.

(21) Appl. No.: 10/499,533

(22) PCT Filed: Dec. 20, 2002

(86) PCT No.: PCT/EP02/14677

§ 371 (c)(1),
(2), (4) Date: Jun. 21, 2004

(87) PCT Pub. No.: WO03/055257

PCT Pub. Date: Jul. 3, 2003

(65) Prior Publication Data

US 2005/0018616 A1 Jan. 27, 2005

(30) Foreign Application Priority Data

Dec. 21, 2001 (EP) .................... 01130733

(51) Int. Cl.
*H04M 3/42* (2006.01)
*H04W 4/00* (2009.01)
(52) U.S. Cl. .................. 455/414.2; 455/435.1
(58) Field of Classification Search ................ 370/339; 455/435.1, 435.2, 435.3, 552.1, 553.1
See application file for complete search history.

(56) References Cited

U.S. PATENT DOCUMENTS 5,267,244 A 11/1993 Messerschmitt et al.

| | | | |
|---|---|---|---|
| 6,006,091 A * | 12/1999 | Lupien | 455/435.1 |
| 6,795,704 B1 * | 9/2004 | Hardin | 455/432.3 |
| 7,006,528 B1 * | 2/2006 | Kokkinen | 370/467 |
| 7,089,008 B1 * | 8/2006 | Back et al. | 455/437 |
| 2002/0071480 A1 * | 6/2002 | Marjelund et al. | 375/141 |
| 2003/0093476 A1 * | 5/2003 | Syed | 709/204 |

FOREIGN PATENT DOCUMENTS

GB    2 347 305    8/2000

OTHER PUBLICATIONS

3rd Generation Partnership Project; Technical Specification Group Radio Access Network; UE Radio Access Capabilities (Release 4); Sep. 2001; pp. 1-23.
Integrated Services Digital Network (ISDN); User-Network Interface Layer 3 Specifications for Basic Call Control; Eruopean Telecommunication Standard ETS 300 102-1; Dec. 1990; pp. 1-213.
GSM Digital Cellular telecommunications system (Phase 2+); Mobile radio interface layer 3 Specification, GSM 04.08, Versions 5.3.0 of Jul. 1996 (8 pages).
GSM Digital Cellular telecommunications systems (Phase 2+); Mobile radio interface layer 3 Specification, GSM 04.08, Draft Version 6.3.0 (Apr. 1999) (11 pages) including publication GSM 04.08, Version 6.3.1 (Aug. 1999) (10 pages), Document History page (1 page).

* cited by examiner

*Primary Examiner*—Nick Corsaro
*Assistant Examiner*—Joel Ajayi
(74) *Attorney, Agent, or Firm*—Staas & Halsey LLP

(57) ABSTRACT

In a radio communications system having network devices and the at least one subscriber station, each subscriber station has specific capabilities determined by parameter values. Parameters are at least partially combined to form at least one parameter class. A class value is respectively assigned to different combinations of parameter values concerning different parameters within the parameter class. The class value of the parameter class, as well as at least one parameter value, are signaled to at least one network device of the communications system. This reduce the signaling complexity and ensures a high degree of flexibility with regard to the capabilities of the subscriber station(s).

16 Claims, No Drawings

METHOD FOR CARRYING OUT THE NETWORK-SIDE RECOGNITION OF SPECIFIC CAPABILITIES OF SUBSCRIBER STATIONS IN A COMMUNICATIONS SYSTEM

CROSS REFERENCE TO RELATED APPLICATIONS

This application is based on and hereby claims priority to European Application No. 01130733.7 filed on Dec. 21, 2001, the contents of which are hereby incorporated by reference.

BACKGROUND OF THE INVENTION

1. Field of the Invention

The invention relates to network-side recognition of specific capabilities of at least one subscriber station in a communications system, particularly in a radio communications system.

2. Description of the Related Art

Communications systems generally contain network devices and at least one subscriber station. Communications systems are playing an increasingly important role, particularly in the business field. At the same time, flexibility requirements are also increasing. It is therefore desirable for communications systems to support various kinds of subscriber stations. In such systems, the diverse nature of subscriber stations is expressed in specific capabilities which a subscriber station provides and/or supports. The specific capabilities of a subscriber station, which are characterized by parameters, are determined or coded by parameter values.

The capabilities of the individual subscriber stations are of great importance for communication in the communications system. It is therefore necessary for parameter values of the subscriber stations to be known on the network side, i.e. in at least one network device of the communications system, so that communication can ensue according to the specific capabilities of a subscriber station. In particular, the communication can be adapted to the capabilities of the subscriber station on the network side.

The subscriber station generally announces its capabilities in the form of parameter values to at least one network device of the communications system. Due to the high complexity of modern communications systems, the capabilities of subscriber stations are mostly determined by a plurality of parameters.

An example of a communications system which is particularly complex is a radio communications system. Here there are a large number of parameters which correspond to the capabilities of the subscriber stations, i.e. the mobile stations. Examples thereof are, for instance, the memory available, the supported data rate and the computing power.

In radio communications systems, information (for example speech, image information or other data) is transmitted with the aid of electromagnetic waves between a base station and a mobile station via a radio interface. In such a system, the electromagnetic waves are emitted using carrier frequencies which are in the frequency band provided for the system in question. Frequencies in the frequency band of around 2000 MHz are provided for future mobile radio systems using TD/CDMA transmission methods or FD/CDMA transmission methods via the radio interface, such as, for example, the UMTS (Universal Mobile Telecommunications System) or other systems of the third generation.

With respect to radio communications systems of the third generation, the capabilities denoted as "UE capabilities" (UE=User Equipment) are for example described as parameters and parameter values for mobile stations of a radio communications system of the third generation in the specification for the UMTS standard:

3GPP Technical Specification TS 25.306,

Version 4.2.0 (2001-09)

"UE Radio Access Capabilities"

(Release 4).

From a network point of view it is advantageous if the number of different capabilities of subscriber stations that has to be supported is not too high since each of said subscriber stations potentially has to be configured individually by the network.

On the other hand, however, it is important for many different capabilities of subscriber stations to be accepted so that the different requirements that exist at the user end in terms of the capabilities of the subscriber stations in the communications system can be supported. Concomitant with this, there is on the part of the manufacturers of subscriber stations a desire for the subscriber stations manufactured by them to be distinguishable from those produced by other manufacturers, by virtue of the particular capabilities thereof.

A high flexibility with respect to the diverse nature of the subscriber stations accepted in a communications system means that a high number of parameter values have to be transmitted to the network. On the other hand, a preset limited selection of parameters or parameter values restricts the flexibility.

SUMMARY OF THE INVENTION

The problem addressed by the present invention is therefore that of disclosing a method and a communications system of the kind mentioned above, having on the one hand a high degree of flexibility with respect to the specific capabilities of the subscriber stations in the communications system, and on the other hand allowing a reduction in the number of signals that need to be transmitted between the subscriber station and the network.

According to the invention, parameters are combined at least partially into at least one parameter class, a respective class value being assigned to various combinations of parameter values relating to different parameters within the at least one parameter class. Both the class value of the at least one parameter class and at least one parameter value are signaled to at least one network device of the communications system.

The invention is based on the concept of combining two possible statements. In the first statement, the number of values that need to be transmitted could be vastly reduced by transmitting all the parameter values exclusively coded in class values, with the result that each respective class value represents a plurality of parameter values combined within the parameter class. If only a limited number of parameter classes are accepted in a communications system, however, there is then only a limited possibility of differentiation with respect to the capabilities of the subscriber stations. A different statement offers the utmost flexibility with respect to the capabilities of subscriber stations, yet it requires the transmission of all the parameter values individually to at least one network device of the communications system.

The advantage of a hybrid method is that, on the one hand, it ensures flexibility with respect to the subscriber stations supported by the communications system but on the other hand, by having partial recourse to the transmission of signals for class values of parameter classes, it significantly reduces the number of signals that need to be transmitted.

The above reduction is of great importance particularly with respect to radio communications systems, since the radio interface represents a critical resource, which can clearly be used more sparingly as a result of the reduction in the number of signals that need to be transmitted.

These and other objects and advantages of the present invention will become more apparent and more readily appreciated from the following description of an exemplary embodiment.

DETAILED DESCRIPTION OF THE PREFERRED EMBODIMENT

In the development of the invention, in the at least one parameter class, parameter values having minimum capabilities with respect to the parameters of the at least one parameter class are combined. This has the advantage that from time to time deviations are possible between, on the one hand, the one or a plurality of parameter values of the parameter class signaled to the network device by the parameter value, and on the other hand, the parameter value corresponding to the actual capability of the subscriber station or the parameter values corresponding to the actual capabilities of the subscriber station. Such deviations are likely to relate only to an increase in the capability, however.

Within the context of the invention, there is a possibility that the at least one parameter class contains the parameter of the at least one parameter value. In such a case, the parameter value signaled individually replaces the value corresponding to the same parameter coded in the parameter class.

It is possible, however, that the at least one parameter of the at least one parameter value is different from the parameters of the at least one parameter class. In such a case, the parameter value signaled individually completes the parameter values coded with the class value of the parameter class.

The aforementioned options can also be combined to the effect that parameter values of at least two parameters are signaled, at least one first parameter being included in the parameters of the at least one parameter class and at least one second parameter being different from the parameters of the at least one parameter class.

In the development of the invention, the parameters combined to form the at least one parameter class are selected on the basis of the relevance thereof to communication. This enables appropriate weightings to be carried out for the signaling of the parameter values.

The number of signals that need to be transmitted can additionally be reduced by not signaling parameter values relating to parameters for which all subscriber stations of the communications network have an identical parameter value.

The communications system according to the invention, in particular a radio communications system, contains network devices, at least one subscriber station. At least one network device performs the network-side recognition of specific capabilities of the at least one subscriber station, which capabilities are characterized by parameters and are determined by parameter values. Furthermore, a communication path is provided for the signaling of both one class value of at least one parameter class and at least one class value of the at least one subscriber station to at least one network device of the communications system, parameters being combined at least partially into at least one parameter class and a respective class value being assigned to various combinations of parameter values for different parameters within the at least one parameter class.

The components of the communications system according to the invention that have prime importance within the context of the invention are the network device and the subscriber station of the communications system, in particular of the radio communications system.

Network devices according to the invention provide
network-side recognition of specific capabilities of an at least one subscriber station of the communications system, which capabilities are characterized by parameters and are determined by parameter values, and
receiving and processing of signaling data which contain both a class value of at least one parameter class and at least one parameter value of the at least one subscriber station, parameters being combined at least partially into at least one parameter class and a respective class value being assigned to various combinations of parameter values relating to different parameters within the at least one parameter class.

Subscriber stations according to the invention
transmit to at least one network device of the communications system signaling data which contain parameter values for the specific capabilities of the subscriber station, which capabilities are characterized by parameters, and
hold and transmit signaling data to the network device of the communications system, which data contain both a class value of at least one parameter class and at least one parameter value of the subscriber station, parameters being at least partially combined into at least one parameter class and a respective class value being assigned to various combinations of parameter values for different parameters within the at least one parameter class.

The invention is described hereafter using a simplified example.

The present example considers only parameters of subscriber stations of a radio communications system, that is the data rate and the memory. In the radio communications system, there are for example the parameter classes A, B and C, which are shown in the table below.

| Parameter class | Data rate | Memory |
| --- | --- | --- |
| A | 14.4 kbit/s | 10 kB |
| B | 64 kbit/s | 100 kB |
| C | 128 kbit/s | 200 kB |

A mobile station is intended to be able to signal to at least one network device that it has, as minimum capabilities, the capabilities of the parameter class, for example. In addition, however, the subscriber station is supposed to be able to indicate that it has for example a memory of 200 kB. In a complex radio communications system working according to the radio standard UMTS, for example, first the class value of parameter class B and additionally a parameter value for the memory of 200 kB can be signaled to the at least one network device.

The invention has been described in detail with particular reference to preferred embodiments thereof and examples, but it will be understood that variations and modifications can be effected within the spirit and scope of the invention.

The invention claimed is:

1. A method for network-side recognition of specific capabilities of subscriber stations in a radio communications system containing network devices and at least one subscriber station, comprising:
   containing one or more parameters that are used for determining the specific capabilities of the subscriber stations in at least one parameter class;
   specifying each parameter class to represent various combinations of parameter values relating to the one or more parameters contained in each parameter class;
   assigning a class value to each parameter class to indicate a respective parameter class;
   signaling, by the subscriber station, both a class value that indicates a parameter class, the class value being a representation of both of one or more parameters contained within the parameter class and the values of the one or more parameters contained within the parameter class, and at least one other parameter value of any parameter, to at least one network device of the radio communications system; and
   specific capabilities of a subscriber station being determinable by a network device by;
      receiving both a class value and other parameter value of any parameter,
      according to a comparison with specified parameter classes, recognizing based upon the received class value one or more parameters contained within a parameter class and values of the one or more parameters contained within the parameter class, and
      recognizing the other parameter value of any parameter.

2. A method according to claim 1, wherein said containing contains in a parameter class parameter values having minimum capabilities with respect to the parameters of the parameter class.

3. A method according to claim 1, wherein the parameter class indicated by the signaled class value contains the any parameter of the at least one other parameter value.

4. A method according to claim 1, wherein the any parameter having the at least one other parameter value differs from parameters contained in the parameter class indicated by the signaled class value.

5. A method according to any one of claims 1 to 4, further comprising selecting the parameters contained in the at least one parameter class based on relevance thereof to communication.

6. A method according to any one of claims 1 to 4, wherein said signaling does not include parameter values for common parameters for which all subscriber systems of the communications system have an identical parameter value.

7. A method according to claim 1, wherein the parameter class indicated by the signaled class value contains the parameter of the at least one other parameter value, and the parameter of the as least one other parameter value replaces a value corresponding to a same parameter contained in the parameter class indicated by the signaled class value.

8. A method according to claim 2, wherein the parameter class indicated by the signaled class value contains the any parameter of the at least one other parameter value.

9. A method according to claim 2, wherein the any parameter having the at least one other parameter value differs from parameters contained in the parameter class indicated by the signaled class value.

10. A method according to any one of claims 3 to 4, wherein said signaling signals other parameter values of at least two other parameters, including at least one first parameter contained in the parameter class indicated by the signaled class value and at least one second parameter different from the parameters contained in the parameter class indicated by the signaled class value.

11. A method according to claim 10, further comprising selecting the parameters contained in the at least one parameter class based on relevance thereof to communication.

12. A method according to claim 10, wherein said signaling does not include parameter values for common parameters for which all subscriber systems of the communications system have an identical parameter value.

13. A method according to claim 5, wherein said signaling does not include parameter values for common parameters for which all subscriber systems of the communications system have an identical parameter value.

14. A radio communications system, comprising:
   at least one subscriber station having specific capabilities represented by parameters and the specific capabilities determinable by parameter values of the parameters,
      wherein
         one or more of the parameters are contained in at least one parameter class,
         each parameter class represents various combinations of parameter values relating to the one or more parameters contained in each parameter class, and
         a class value is assigned to each parameter class to indicate a parameter class, and
      wherein a subscriber station being configured to signal both a class value that indicates a parameter class, the class value being a representation of one or more parameters contained within the parameter class and the values of the one or more parameters contained within the parameter class, and at least one other parameter value of any parameter, to at least one network device of the radio communication system; and
   network devices, configured to communicate with the at least one subscriber station, a network device configured to determine specific capabilities of a subscriber station based upon receiving both a class value and other parameter value of any parameter, and to recognize from the received class value by a comparison with specified parameter classes, one or more parameters contained within a parameter class and values of the one or more parameters contained within the parameter class, and to recognize the other parameter value of any parameter.

15. A network device of a radio communications system performing network-side recognition of specific capabilities of at least one subscriber station of the communications system, where the specific capabilities are represented by parameters and the specific capabilities are determined by parameter values of the parameters, comprising:
   means for receiving from the at least one subscriber station signaling data which contain both a class value that indicates a parameter class,
      wherein
         one or more of the parameters are contained in at least one parameter class,
         each parameter class represents various combinations of parameter values relating to the one or more parameters contained in each parameter class, and
         a class value is assigned to each parameter class to indicate a parameter class,
      thereby the signaled class value being a representation of both of one or more parameters contained within the parameter class and values of the one or more parameters within the parameter class, and
      at least one other parameter value of any parameter;

means for receiving both a class value and other parameter value of any parameter; and means for recognizing specific capabilities of a subscriber station by recognizing from the received class value based upon a comparison with specified parameter classes, one or more parameters contained within a parameter class and values of the one or more parameters contained within the parameter class and recognizing the other parameter value of any parameter.

16. A subscriber station of a radio communications system having at least one network device, comprising:

means for transmitting to at least one network device of the communications system signaling data relating to specific capabilities of the subscriber station, which are determinable according to parameter value of parameters representing the specific capabilities;

means for containing one or more of the parameters, in at least one parameter class;

means for specifying each parameter class to represent various combinations of parameter values relating to the one or more parameters contained in each parameter class;

means for assigning a class value, to each parameter class to indicate a parameter class; and means for signaling, by the subscriber station, both a class value that indicates a parameter class, the class value being a representation of both one or parameters contained within the parameter class and the values of the one or more parameters contained within the parameters class, at least one other parameter value of any device of any parameter, to a network device of the radio communications systems.

* * * * *